US007036308B2

(12) United States Patent
Rollmann

(10) Patent No.: US 7,036,308 B2
(45) Date of Patent: May 2, 2006

(54) HYDROSTATIC DRIVE SYSTEM WITH A SAFETY DEVICE

(75) Inventor: Tobias Rollmann, Grossostheim (DE)

(73) Assignee: Linde Aktiengesellschaft, Wiesbaden (DE)

(*) Notice: Subject to any disclaimer, the term of this patent is extended or adjusted under 35 U.S.C. 154(b) by 32 days.

(21) Appl. No.: 10/941,035

(22) Filed: Sep. 14, 2004

(65) Prior Publication Data

US 2005/0098030 A1 May 12, 2005

(30) Foreign Application Priority Data

Sep. 15, 2003 (DE) ................................ 103 42 789

(51) Int. Cl.
*F16D 31/02* (2006.01)

(52) U.S. Cl. .......................................... 60/422; 60/468

(58) Field of Classification Search .................. 60/422, 60/468
See application file for complete search history.

(56) References Cited

U.S. PATENT DOCUMENTS 4,723,409 A * 2/1988 Kuhn .......................... 60/422

FOREIGN PATENT DOCUMENTS

DE 102 24 731 A1 1/2003

* cited by examiner

*Primary Examiner*—Edward K. Look
*Assistant Examiner*—Michael Leslie
(74) *Attorney, Agent, or Firm*—The Webb Law Firm

(57) ABSTRACT

A hydrostatic drive system (1) has at least one user. A control valve device (3; 4; 5; 6) to control the user is actuated by an actuation signal. A delivery flow regulation device (11) is triggered by a load pressure signal of the user. The drive system has a safety device (20) with a function position (21*b*) in which the actuation signal is routed to the control valve device (3; 4; 5; 6) and the load pressure signal is routed to the delivery flow regulation device (11), and a safety position (21*a*) in which the control valve device (3; 4; 5; 6) is discharged by the actuation signal and the delivery flow regulation device (11) by the load pressure signal. The safety device (20) also has a discharge position (21*c*) in which the connection of the control valve device (3; 4; 5; 6) with the user is discharged.

22 Claims, 2 Drawing Sheets

HYDROSTATIC DRIVE SYSTEM WITH A SAFETY DEVICE

CROSS REFERENCE TO RELATED APPLICATION

This application claims priority to German Application No. 103 42 789.9 filed Sep. 15, 2003, which is herein incorporated by reference in its entirety.

BACKGROUND OF THE INVENTION

1. Field of the Invention

This invention relates to a hydrostatic drive system with at least one user that is connected to a pump. To control the user, there is a control valve device that can be actuated by means of an actuation signal, and a delivery flow regulation device that can be triggered by a load pressure signal of the user. The drive system has a safety device by means of which the triggering of the control valve device can be controlled with the actuation signal and the triggering of the delivery flow regulation device can be controlled with the load pressure signal. The safety device has a function position in which the actuation signal is routed to the control valve device and the load pressure signal is routed to the delivery flow regulation device, and has a safety position in which the control valve device is discharged by the actuation signal and the delivery flow regulation device is discharged by the load pressure signal.

2. Technical Considerations

Drive systems of the above type are used in work machines, such as industrial trucks, as hydraulic work systems with a lifting drive, a tilting drive, and at least one accessory user, such as a side loader, for example. The safety device is provided so that in the event of a disruption, a malfunction, or a defect in the drive system, the operation of the user can be prevented and hazardous operating conditions can thus be avoided.

A drive system is described in DE 102 24 731 A1. In that case, a safety device realized in the form of a safety valve is provided which has a safety position and a function position. In the safety position, the delivery flow regulation device is discharged by the load pressure signal and the control valves are discharged by the actuator signal. In the function position, the load pressure signal is routed to the delivery flow regulation device and the actuator signal to the control valves. In the event of a disruption, a malfunction, or a defect of the drive system, the operation of the user can be reliably prevented by a corresponding actuation of the safety valve into the safety position.

In a generic drive system equipped with a safety device of this type, however, it has been found that accessory users that are connected to the corresponding control valve by means of hydraulic couplings, such as quick-release couplings, for example, cannot be coupled and uncoupled easily.

When the safety valve is in the safety position, the pressure in the lines that connect the accessory users to the safety valve device is reduced and, therefore, the pressure at the user connections of the accessory users is reduced only by means of leakage at the pistons of the control valve devices. However, this leakage at the pistons of the control valve devices depends on the manufacturing tolerances of the valves and the temperature. When the control valve devices are manufactured with a high degree of precision and thus low tolerances and when the temperature is low, the pressure reduction at the user connections of the accessory users can be insufficient so that the quick-release couplings cannot be handled easily and/or with a reasonable application of force to disconnect or connect the connections of the accessory users with the corresponding safety valve device for the uncoupling or coupling of the accessory users.

When the safety valve is moved into the function position, although one side of the user can be discharged to the reservoir by an actuation of the control valve device when there is a dual-action accessory user, when the control valve device is actuated the other side of the user is connected to the delivery line of the pump. As a result of the load pressure of this user, which is transported to the delivery flow regulation device, a delivery pressure that corresponds to the load pressure of the user is immediately generated at the corresponding user connection. This means that the uncoupling of the quick-release coupling that corresponds to this user line cannot be done with the application of a reasonable amount of force. Nor can the accessory user be connected easily because, when the control valve device is actuated, even though one side of the user can be discharged to the reservoir, the other side of the user is in turn connected with the delivery line of the pump by means of the actuated control valve device. When the quick-release coupling is closed and the user is uncoupled, the delivery pressure of the pump immediately increases to a value specified by a safety device, for example a pressure governor valve or a pressure cutoff valve, that responds at a maximum delivery pressure. As a result of which, the quick-release coupling that corresponds to this user side cannot be actuated with the application of a reasonable amount of force to couple the accessory user.

Therefore, it is an object of this invention to provide a drive system of the general type described above but which makes possible improved handling and facilitates the coupling and uncoupling of the users.

SUMMARY OF THE INVENTION

The invention teaches that a safety device can be provided with a discharge position in which the connection between the control valve device and the user can be discharged. The invention therefore provides the control device with an additional discharge position in which the connections of the safety valve device with the user, and thus the user connections, can be discharged. As a result of the discharge of the user connections, the couplings, such as quick-release hydraulic couplings, for example, with which the user is connected with the control valve device, can be actuated more easily with the application of only a small amount of force compared to known devices. As a result of which, the user can be connected and disconnected easily.

In one particularly advantageous realization of the invention, in the discharge position of the safety device, the actuator signal is routed to the control valve device and the delivery flow regulation device is discharged by the load pressure signal. In the discharge position, therefore, the control valve devices can be triggered by the actuator signal, whereby only a low circulation pressure is generated in the delivery line by the delivery flow regulation device. The user connections can, therefore, be discharged to the reservoir or they are only pressurized at a low circulation pressure that is generated by the delivery flow regulation device. As a result of which, the quick-release couplings can be actuated with the application of only a small amount of energy compared to known devices and, thus, the accessory users can be connected and disconnected more easily.

It is particularly advantageous if, in the discharge position of the safety device, the connection of the control valve device with the user can be discharged by the actuation of the control valve device. By an actuation of the safety valve device, for example on a dual-action accessory user an actuation of the control valve device in both directions, both user connections can be discharged to the low circulation pressure when the safety device is in the discharge position. As a result of which, the quick-release couplings can be connected or disconnected with the application of a small amount of force for the coupling or uncoupling of the accessory user.

When the actuator signal is realized in the form of a hydraulic control pressure and the load pressure control signal is in the form of a hydraulic load pressure, the result is a simple construction of the safety device when the safety device is realized in the form of a hydraulic safety valve, in particular a switching valve.

In this case, the safety valve is advantageously connected to a control pressure supply line that is in communication with a control pressure source, to a control pressure line that leads to the control valve device, to a load pressure line that leads to the delivery flow regulation device that is, in turn, connected to a load pressure signal branch line, and to a reservoir line that leads to a reservoir. Consequently, with little additional effort in terms of the circuitry and connections, the actuation of the control valve can be controlled with the control pressure in the control pressure line and the actuation of the delivery flow regulation device can be controlled by the safety valve with the load pressure that is carried in the load pressure signal branch line.

In the function position of the safety valve, it is easily possible to transport the control pressure to the control valve device and the load pressure to the delivery flow regulation device, if the safety valve in the function position connects the control pressure supply line to the control pressure line, and shuts off the load pressure signal branch line which is in communication with the load pressure signal line.

The users can be easily stopped in a safe position if the safety valve in the safety position shuts off the control pressure supply line, connects the control pressure line with the reservoir line, and connects the load pressure signal branch line that is in communication with the load pressure signal line with the reservoir, in particular with the reservoir line.

In one advantageous embodiment of the invention, the safety valve in the discharge position connects the control pressure supply line with the control pressure line. In the discharge position of the safety valve, the control valve devices can thereby be actuated to discharge the user connections by the control pressure that is present in the control pressure line.

In the discharge position, the safety valve thereby advantageously connects the load pressure signal branch line that is in communication with the load pressure signal line with the reservoir, in particular with the reservoir line. The load pressure signal line is thereby discharged to the reservoir. As a result of which, when the consumer is actuated when the safety valve is in the discharge position, only a low circulation pressure in the delivery line is generated by the delivery flow regulation device, which low circulation pressure is present at the user connections. To connect and disconnect the user, the quick-release couplings can be connected and disconnected with the application of a small amount of force.

It is particularly advantageous that the discharge position is realized between the safety position and the function position. A safety valve of the known art with a safety position and a function position can be provided with little construction effort or expense by the appropriate configuration of the piston flange and the overlapping of the control piston of the safety valve with the discharge position of the invention.

The safety valve can be advantageously actuated electrically.

If the safety valve can be moved into the discharge position and into the function position, it becomes easily possible to move the safety valve in the unactuated state into the safety position.

In one embodiment of the invention, the safety valve can be moved toward the discharge position by the actuation of a command device, such as a switch. To discharge the user connections for the coupling and/or uncoupling of the accessory users, the safety valve can be easily moved into the discharge position by the actuation of a switch.

It is particularly advantageous if the safety valve can be actuated by means of a magnet, such as a variable-strength magnet, into the discharge position and into the function position. By means of the appropriate actuation by a variable-strength magnet, the safety valve can easily be moved into the discharge position or into the function position.

If the safety valve is moved into the safety position by means of a spring, it becomes possible to easily guarantee that the safety valve can be moved into the safety position when it is not actuated.

In one embodiment of the invention, the control valve device can be actuated electro-hydraulically. Electrically actuated pilot valves that generate an actuation pressure that actuates the control valve device can be associated with the control pressure line.

A hydrostatic drive system of the invention can be used particularly advantageously as the hydraulic work system of a work machine, such as an industrial truck. As a result of the presence of the safety valve of the invention, an accessory user, such as a side loader, for example, can be easily coupled to and uncoupled from the corresponding control valve device by means of hydraulic couplings, such as quick-release couplings.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
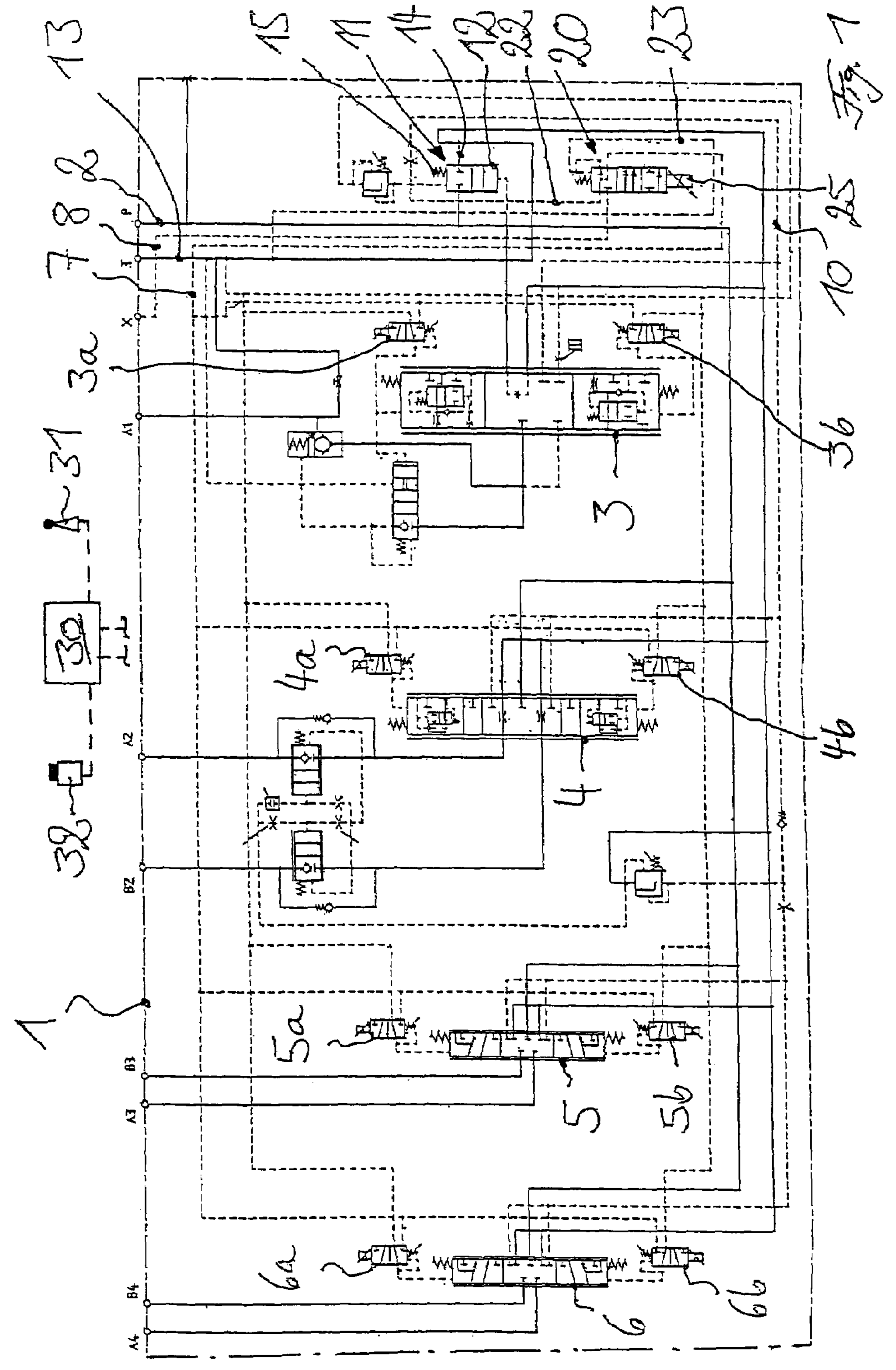
FIG. 1 is a circuit diagram of a first realization of a drive system of the invention.

FIG. 1 shows an exemplary drive system 1 of the invention that is realized in the form of a hydraulic work system of an industrial truck. Connected to a delivery line 2 that is in communication with a pump (not shown) are a first control valve device 3 to control a lifting drive (not shown) connected to the connection A1, a second control valve device 4 to control a tilting drive (not shown) connected to the connections A2, B2, and one or more additional control valve devices 5, 6 to control accessory drives (not shown), such as the drive system of a side loader, for example. The control valve devices 5 and 6 of the accessory users are in communication with connections A3, B3 and A4, B4, respectively, to which the accessory users can be connected by means of hydraulic couplings, such as quick-release hydraulic couplings, for example.

The control valve devices 3, 4, 5, 6 can be actuated electro-hydraulically. For this purpose, for the actuation of the control valve device 3, electrically actuated pilot valves 3*a*, 3*b* can be provided; for the actuation of the control valve device 4, electrically actuated pilot valves 4*a*, 4*b* can be provided; for the actuation of the control valve device 5, electrically actuated pilot valves 5*a*, 5*b* can be provided, and for the actuation of the control valve device 6, electrically actuated pilot valves 6*a*, 6*b* can be provided. The pilot valves can thereby be realized, for example, in the form of electrically actuated pressure reducing valves. The pilot valves are in communication with a control pressure line 7, which can be connected to a control pressure supply line 8. The control pressure supply line 8 is in communication, for example, with a control pressure source (not shown), which can be in the form of a feed pump.

The pilot valves 3*a*, 3*b*, 4*a*, 4*b*, 5*a*, 5*b*, 6*a*, 6*b* can be actuated electrically, for example by means of individual variable-strength magnets, and can be connected with an electronic control device 30, which is effectively connected on the input side with a setpoint command device 31, such as a joystick, for example.

The load pressure downstream of the corresponding choke points of the control valve devices 3, 4, 5, 6 on the users when the control valve devices are actuated is present in a load pressure signal line 10 which leads to a delivery flow regulation device 11. The delivery flow regulation device 11 can be realized in the form of a supply pressure compensator 12 which can be located in a connecting line 14 that connects the delivery line 2 with a reservoir line 13 that leads to a reservoir. The supply pressure compensator 12 can thereby be moved in the direction of a shutoff position by the load pressure signal of the actuated user present in the load pressure signal line 10 and by a spring 15. The supply pressure compensator 12 can be moved in the direction of an open position by the delivery pressure that is present in the delivery line 2.

Figure 2:
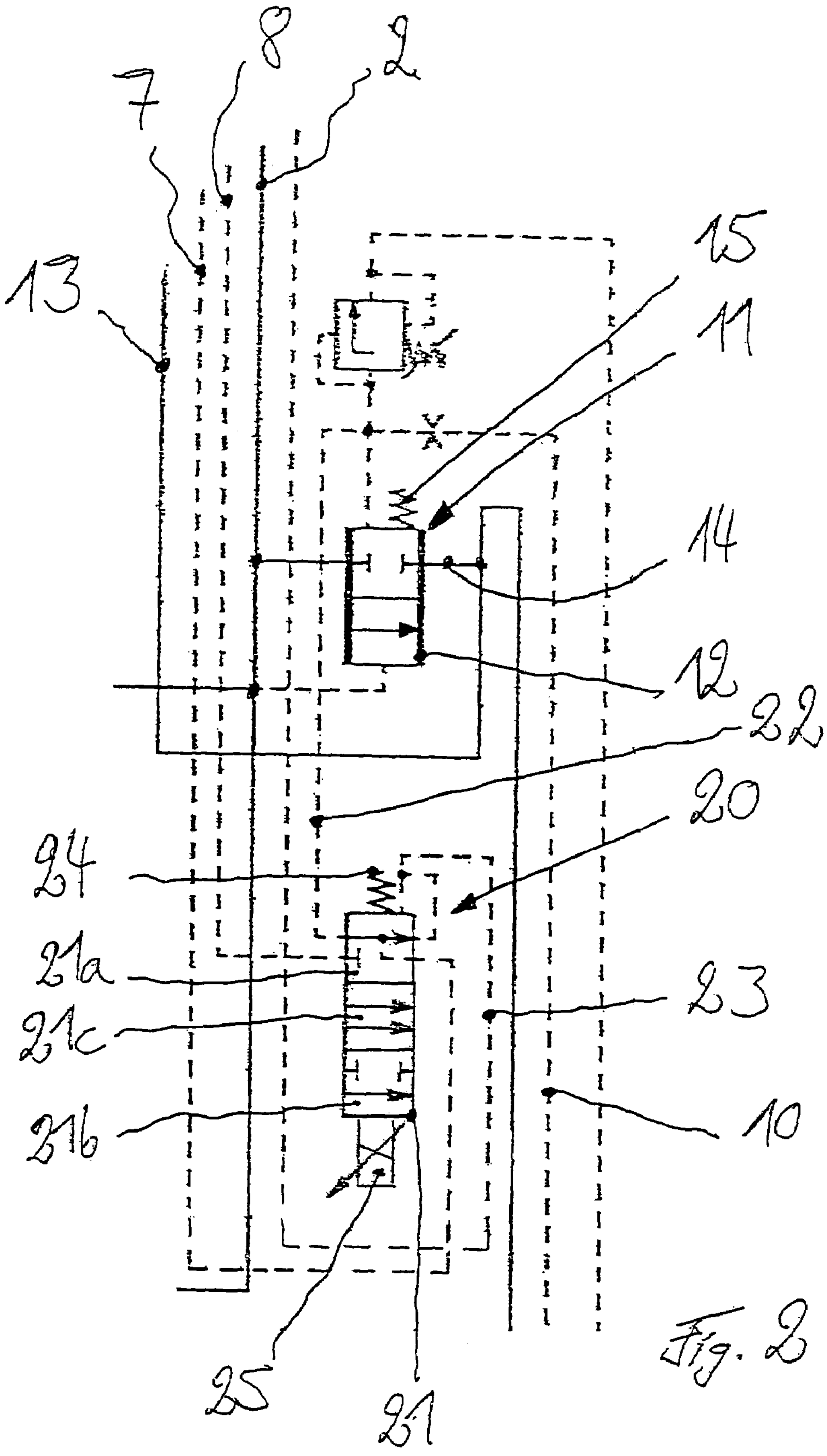
FIG. 2 is an enlarged detail of a portion of FIG. 1.

The drive system 1, as shown in detail in FIG. 2, can be provided with a safety device 20 which is realized in the form of a safety valve 21. The safety valve 21 can be in communication on the input side with the control pressure supply line 8 and a load pressure signal branch line 22 that branches off from the load pressure signal line 10. On the output side, the safety valve 21 can be connected to the control pressure line 7 and a reservoir branch line 23 that leads to the reservoir line 13.

The safety valve 21 can be realized in the form of a switching valve and can have a safety position 21*a* in which the load pressure signal branch line 22 and the control pressure line 7 are in communication with the reservoir branch line 23, and the control pressure supply line 8 is shut off. In a function position 21*b* of the safety valve 21, the load pressure signal branch line 22 and the reservoir branch line 23 are shut off. In the function position 21*b*, the control pressure supply line 8 is in communication with the control pressure line 7.

The invention teaches that the safety valve 21 is provided with a discharge position 21*c* in which the control pressure supply line 8 is connected with the control pressure line 7 and in which the load pressure signal branch line 22 is connected with the reservoir branch line 23. Thus, the load pressure signal line 10 to the reservoir is discharged.

The discharge position 21*c* is hereby realized in the form of a middle position of the safety valve 21 that lies between the safety position 21*a* and the function position 21*b*.

The safety valve 21 can be moved toward the safety position 21*a* by means of a spring 24. The safety valve 21 can be moved electrically toward the discharge position 21*c* and toward the function position 21*b*. For this purpose, a magnet 25 can be advantageously provided in the form of a variable-strength magnet.

The safety valve 21 can be moved as a function of the actuation of a command device 32 (FIG. 1), such as a switch for example, into the discharge position 21*c*. The command device 32 and the magnet 25 can thereby advantageously be connected to the electronic control device 30.

In one embodiment, the drive system of the invention functions as follows:

In normal operation of the drive system, the safety valve 21 is moved by a corresponding actuation of the magnet 25 into the function position 21*b*, in which the control pressure supply line 8 is in communication with the control pressure line 7 and the load pressure signal branch line 22 is shut off.

Therefore, there is a control pressure in the control pressure supply line 8. When there is a corresponding actuation of one or more of the pilot valves 3*a*, 3*b*, 4*a*, 4*b*, 5*a*, 5*b*, 6*a*, 6*b*, an actuation pressure can be generated which actuates one or more of the control valve devices 3, 4, 5, 6 as a function of an actuation of the setpoint command device 31.

The highest load pressure that is present in the actuated users is in the load pressure signal line 10 and moves the supply pressure compensator 12 toward the closed position. A delivery pressure for the actuation of the users can, therefore, be accumulated in the delivery line 2.

In the event of a disruption, a malfunction, or a defect of the drive system, for example a failure of the electronic control device 30, the actuation of the magnet 25 is ended. The safety valve 21 is moved by the spring 24 into the safety position 21*a*, in which the branch line 22 and the control pressure line 7 are in communication with the reservoir branch line 23 and thus with the reservoir, and the control pressure supply line 8 is shut off.

The control pressure line 7 is therefore discharged. As a result of which, the feed pressure and, thus, the actuation pressure generated by the actuated pilot valves 3*a*, 3*b*, 4*a*, 4*b*, 5*a*, 5*b*, 6*a*, 6*b* are discharged to the reservoir. The actuated control valve devices 3, 4, 5, 6 are, therefore, moved into the neutral position in spite of the fact that the pilot valves are actuated.

In the safety position 21*a* of the safety valve 21, the load pressure signal line 10 is also discharged, so that the supply pressure compensator 12 is moved into the open position by the delivery pressure of the pump that is present in the delivery line 2. The delivery pressure that is present at the control valve devices therefore collapses, as a result of which the users can no longer be actuated.

For the coupling and uncoupling of one or more accessory users, the magnet 25 is actuated by the electronic control device 30 in response to a corresponding actuation of the command device 32 so that the safety valve 21 is moved into the discharge position 21*c*. As a result of the connection of the control pressure line 7 to the control pressure supply line 8, when the safety valve 21 is in the discharge position 21*c*, and when the pilot valves 5*a*, 5*b* or 6*a*, 6*b* are actuated by a corresponding actuation of the setpoint command device 31, the control valve devices 5 and 6, respectively, are activated. In the discharge position 21*c*, the load pressure signal branch line 22 is connected to the reservoir branch line 23 and is thus discharged. As a result of which, the supply pressure compensator 12 generates only a low circulation pressure in the delivery line 2 when the corresponding control valve 5 or 6 is actuated. The low circulation pressure corresponds to the value of the bias of the spring 15 in the supply pressure compensator 12. By a dual-action triggering of the corresponding control valve devices 5 and 6, the connecting lines between the control valve devices 5 and 6 and the corresponding user (and thus the connections A3, B3 and A4, B4, respectively, of the accessory users) can be discharged to the low circulating pressure. The hydraulic couplings, for example quick-release couplings, by means of which the accessory user is connected to the corresponding control valve device 5 or 6 can be actuated with the application of a small amount of force, and thus the corresponding accessory user can be easily coupled and uncoupled.

When the actuation of the command device 32 is completed, the safety valve 21 is moved into the safety position 21*a* by the spring 24.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic drive system, comprising:

at least one user connected to a pump;

a control valve device, wherein the control valve device can be actuated by an actuation signal, and a delivery flow regulation device can be triggered by a load pressure signal of the user; and a safety device, by means of which triggering of the control valve device with the actuation signal and triggering of the delivery flow regulation device with the load pressure signal can be controlled, wherein the safety device includes a function position in which the actuation signal is routed to the control valve device and the load pressure signal is routed to the delivery flow regulation device, wherein the safety device has a safety position in which the control valve device is discharged by the actuation signal and the delivery flow regulation device by the load pressure signal, and wherein the safety device includes a discharge position in which the connection of the control valve device with the user can be discharged.

2. The hydrostatic drive system as claimed in claim 1, wherein in the discharge position of the safety device, the actuation signal is routed to the control valve device and the delivery flow regulation device is discharged by the load pressure signal.

3. The hydrostatic drive system as claimed in claim 1, wherein in the discharge position of the safety device, the connection of the control valve device with the user can be discharged by an actuation of the control valve device.

4. The hydrostatic drive system as claimed in claim 1, wherein the actuation signal is a hydraulic control pressure and the load pressure signal is a hydraulic load pressure, and wherein the safety device is a hydraulic safety valve.

5. The hydrostatic drive system as claimed in claim 4, wherein the safety valve is connected to a control pressure supply line which is in communication with a control pressure source, a control pressure line that leads to the control valve device, a load pressure signal branch line which is in communication with the load pressure signal line that leads to the delivery flow regulation device, and a reservoir line that leads to a reservoir.

6. The hydrostatic drive system as claimed in claim 5, wherein in the function position, the safety valve connects the control pressure supply line with the control pressure line and shuts off the load pressure signal branch line that is in communication with the load pressure signal line.

7. The hydrostatic drive system as claimed in claim 5, wherein in the safety position, the safety valve shuts off the control pressure supply line and connects the control pressure line with the reservoir line and connects the load pressure signal branch line which is in communication with the load pressure signal line with the reservoir.

8. The hydrostatic drive system as claimed in claim 5, wherein in the discharge position, the safety valve connects the control pressure supply line with the control pressure line.

9. The hydrostatic drive system as claimed in claim 5, wherein the safety valve in the discharge position connects the load pressure signal branch line which is in communication with the load pressure signal line with the reservoir.

10. The hydrostatic drive system as claimed in claim 4, wherein the discharge position is located between the safety position and the function position.

11. The hydrostatic drive system as claimed in claim 4, wherein the safety valve can be actuated electrically.

12. The hydrostatic drive system as claimed in claim 4, wherein the safety valve can be actuated in the direction of the discharge position and in the direction of the function position.

13. The hydrostatic drive system as claimed claim 12, wherein the safety valve is movable in the direction of the discharge position as a function of the actuation of a command device.

14. The hydrostatic drive system as claimed in claim 4, wherein the safety valve is movable into the discharge position and into the function position by a magnet.

15. The hydrostatic drive system as claimed claim 4, wherein the safety valve is movable into the safety position by a spring.

16. The hydrostatic drive system as claimed in claim 1, wherein the control valve device can be actuated electro-hydraulically, and wherein corresponding to the control pressure line there are electrically actuated pilot valves that generate an actuation pressure that triggers the control valve device.

17. An industrial truck, comprising a hydrostatic drive system as claimed in claim 1.

18. The hydrostatic drive system as claimed in claim 4, wherein the safety device is a switching valve.

19. The hydrostatic drive system as claimed in claim 7, wherein in the safety position, the safety valve connects the load pressure signal branch line with the reservoir line.

20. The hydrostatic drive system as claimed in claim 9, wherein the safety valve in the discharge position connects the load pressure signal branch line with the reservoir line.

21. The hydrostatic drive system as claimed in claim 13, wherein the command device is a switch.

22. The hydrostatic drive system as claimed in claim 14, wherein the magnet is a variable-strength magnet.

* * * * *

UNITED STATES PATENT AND TRADEMARK OFFICE

CERTIFICATE OF CORRECTION

PATENT NO. : 7,036,308 B2
APPLICATION NO. : 10/941035
DATED : May 2, 2006
INVENTOR(S) : Tobias Rollmann It is certified that error appears in the above-identified patent and that said Letters Patent is hereby corrected as shown below:

Column 8, Line 33, Claim 13, “as claimed claim 12” should read -- as claimed in claim 12 --

Column 8, Line 40, Claim 15, “as claimed claim 4” should read -- as claimed in claim 4 --

Signed and Sealed this

Tenth Day of October, 2006

JON W. DUDAS
*Director of the United States Patent and Trademark Office*